April 2, 1929.  W. J. PUGH  1,707,925
SELF PROPELLED VEHICLE
Filed March 7, 1928   3 Sheets-Sheet 3
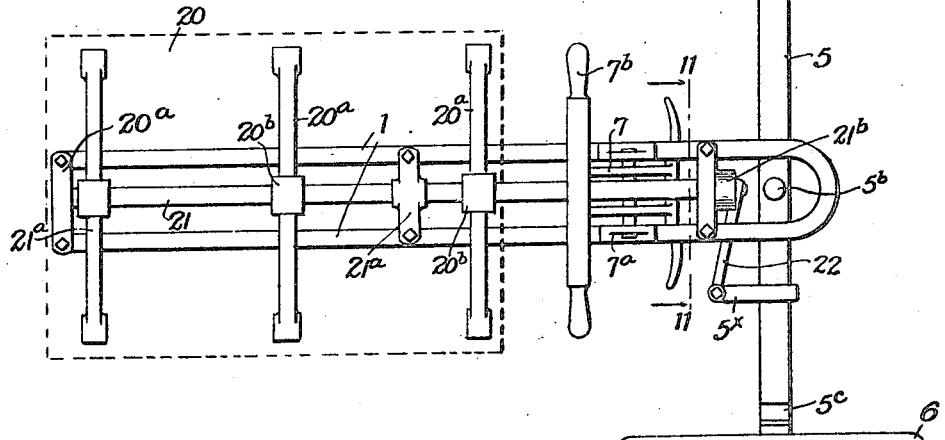
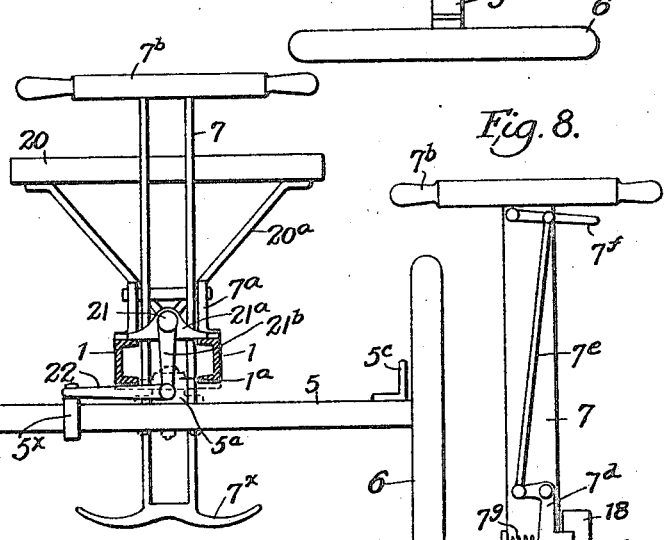
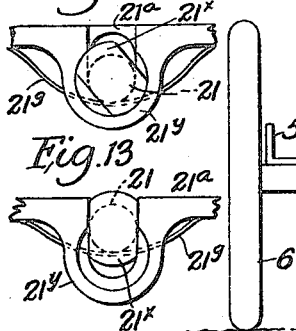
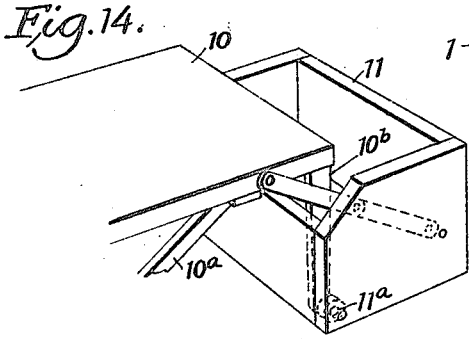
INVENTOR.
William J. Pugh
BY Alexander Powell
ATTORNEYS Patented Apr. 2, 1929.

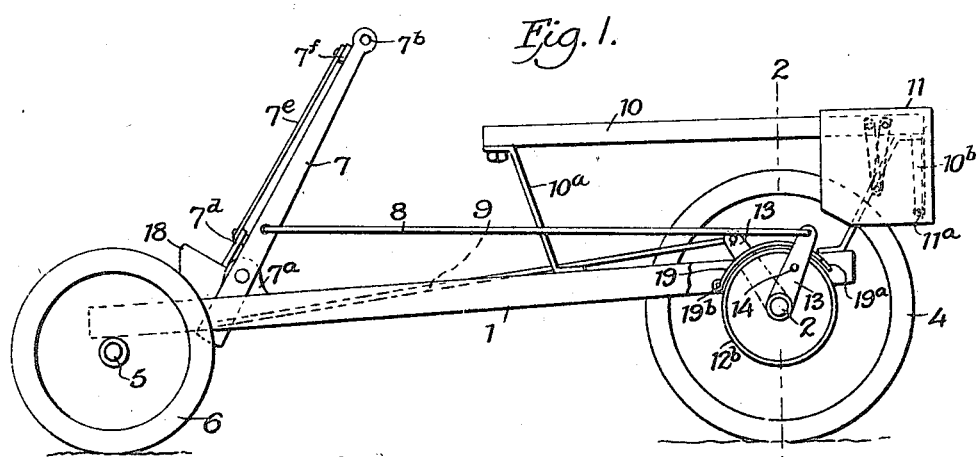
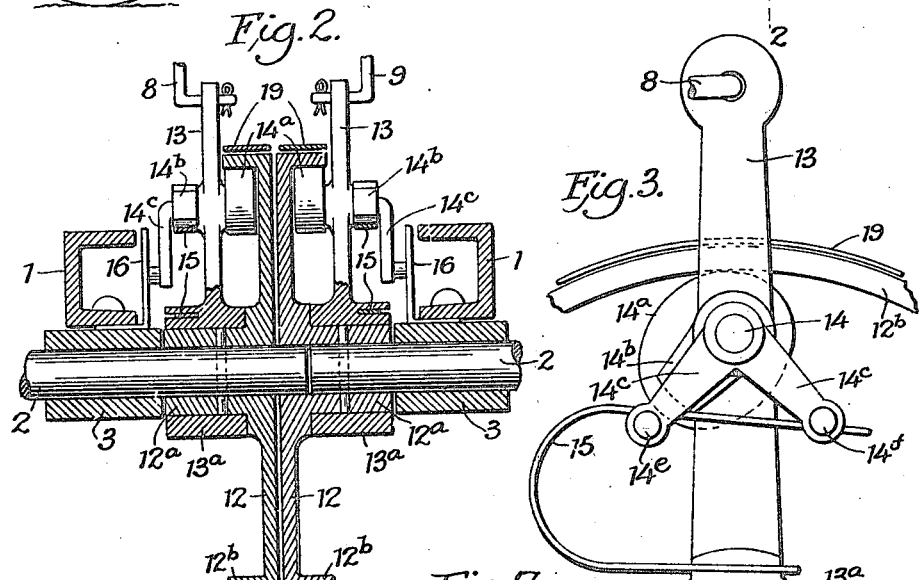
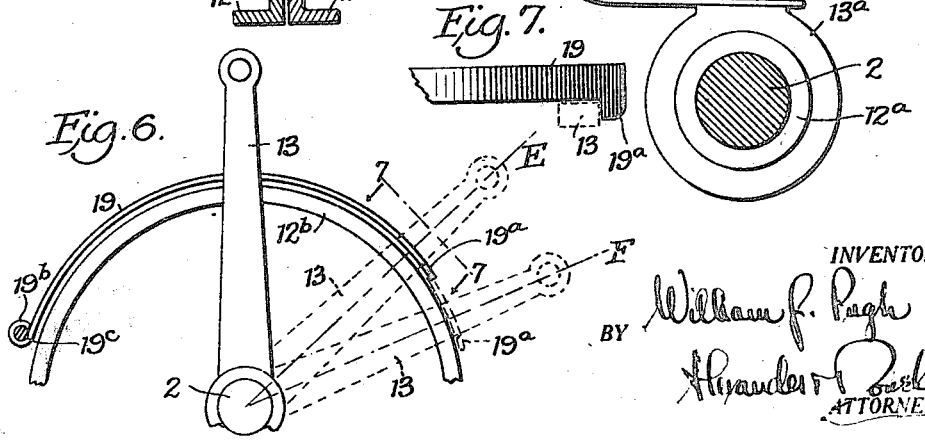

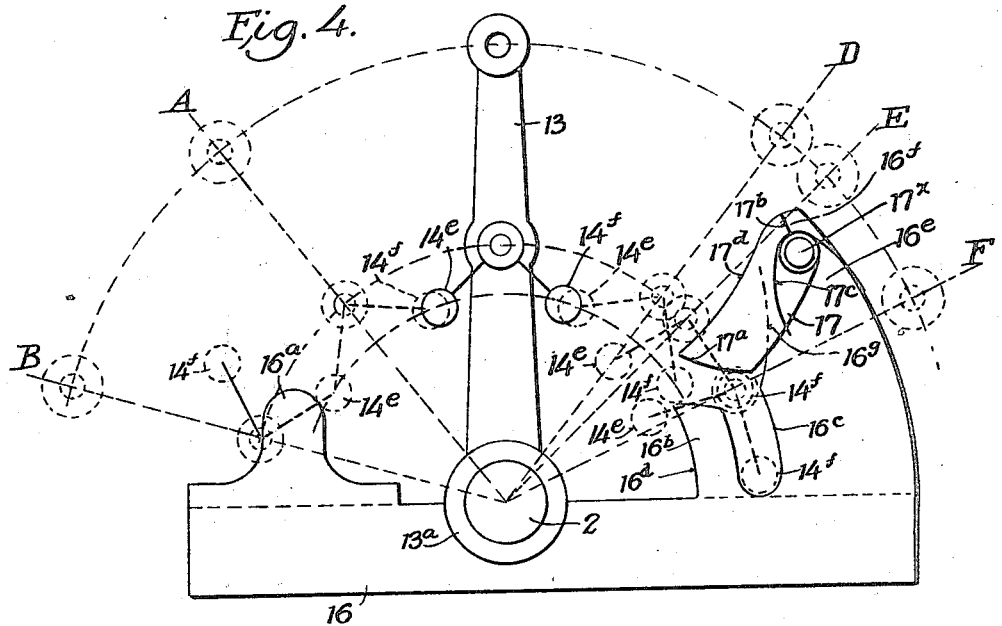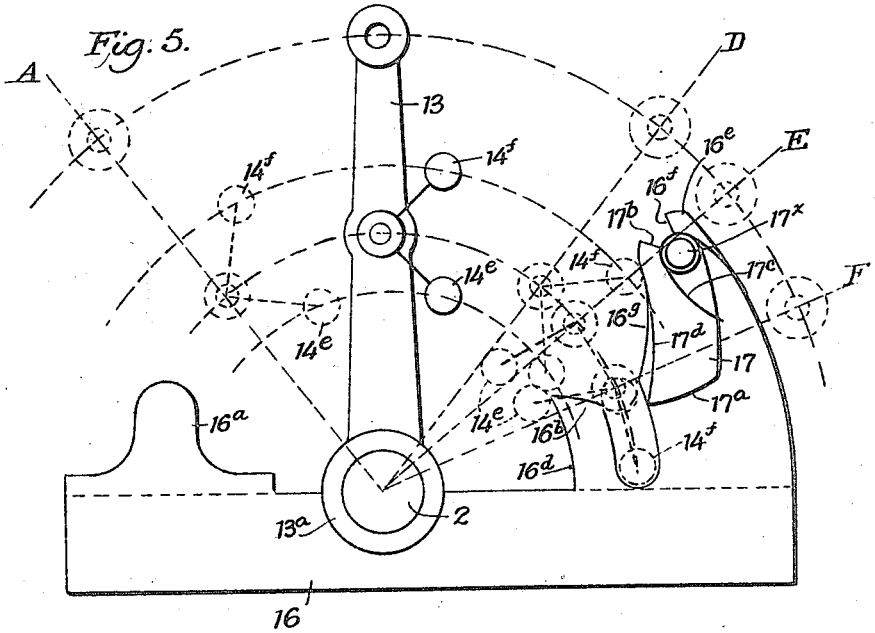

1,707,925

UNITED STATES PATENT OFFICE.

WILLIAM J. PUGH, OF OAKLAND, CALIFORNIA.

SELF-PROPELLED VEHICLE.

Application filed March 7, 1928. Serial No. 259,841.

This invention is a novel improvement in self-propelled vehicles such as so-called "Irish mail" coasters and other similar vehicles particularly adapted for use by children; and the principal object of the invention is to provide a coaster embodying certain novel improvements in the means for propelling, braking, and steering the vehicle in order that same will be more easily operated and safer for children to ride upon.

More specifically the objects of the invention are to provide novel propelling means for separately driving the wheels of the coaster comprising eccentric friction clutch mechanisms adapted to alternately rotate the driving wheels in the forward direction; means for automatically maintaining the clutches in neutral position; automatic means for shifting the clutches for operation in reverse direction; means for automatically maintaining the clutches in neutral position while applying brakes to the driving wheel shafts; manually operated means for limiting the swing of the rocking beam so that same cannot be shifted automatically into reverse; and means for automatically applying the brakes when the propelling rocking beam is pulled into extreme rear position.

Still further objects are to provide means whereby the steering may be accomplished either with the feet in the usual manner or may be accomplished by tilting the operator's seat; also to provide means for normally holding the steering axle in straight-ahead position to prevent sudden turning and upsetting of the vehicle; also to provide a novel folding rumble box for the operator's seat which will fold into and form part of the seat when closed and which when opened will hold small articles.

My invention may be used on either a hand driven vehicle guided by feet such as an "Irish mail" coaster or may be used on self propelled vehicles such as children's toy automobiles of well known type driven by the feet and steered by the hands; or may be used on any other vehicle to which same is adaptable.

I will explain the invention with reference to the accompanying drawings which illustrate several practical embodiments thereof to enable others to adopt and use the same, and will summarize in the claims the novel features of construction, and the novel combinations of parts for which protection is desired.

In said drawings;

Fig. 1 is a side elevation of a coaster embodying one form of the invention.

Fig. 2 is a section on the line 2—2 Fig. 1.

Fig. 3 is an enlarged detail view of the eccentric clutch and its operating mechanism and the adjacent portions of the brake and driving disk.

Fig. 4 is a diagrammatic view of the operation of the clutch actuating mechanisms for forward driving.

Fig. 5 is a similar diagram for reverse driving.

Fig. 6 is a diagrammatic view showing the relation of the lever and brake.

Fig. 7 is a detail of the free end of the brake band.

Fig. 8 is a detail of the means for retracting the sliding bolt on the rocking beam.

Fig. 9 is a top plan view of a modified form of the invention.

Fig. 10 is a front elevation of the modified form.

Fig. 11 is a section on the line 11—11, Fig. 9.

Figs. 12 and 13 are details showing the means for preventing the steering axle from swerving.

Fig. 14 is a perspective view of the rumble box.

In Figs. 1 to 8 inclusive the invention is illustrated in connection with an "Irish mail" coaster of well known type comprising two spaced longitudinal frames 1, supported at their rear ends upon aligned rear axle sections 2 journaled in bearings 3 secured to the side frames 1, said axle sections 2 carrying the rear or driving wheels 4 respectively and the use of the broken rear axle permitting differential rotation of the rear wheels 4. The forward ends of side frames 1 are supported on a front axle 5 carrying the front wheels 6, said axle 5 being provided with a swivel head $5^a$ (Fig. 11) at its center which is pivotally bolted as at $5^b$ to a bearing plate $1^a$ extending between the frames 1. Upon the top of axle 5 adjacent the wheels 6 are clips $5^c$ (Fig. 9) for preventing injury to the feet of the operator by the front wheels 6, the vehicle being steered by resting the feet upon the front axle. Between the frames 1 adjacent the front ends thereof is a rocking beam 7 journaled adjacent its lower end in bearings $7^a$ mounted on the said frames 1. At the top of beam 7 is a handle cross-bar $7^b$ for rocking the beam 7, which beam is connected by two links 8 and 9 to their respective eccentric friction clutch mechanisms, hereinafter described, mounted on the rear axle sections 2 for propelling the vehicle. Above the frames 1 in rear of rocking beam 7 is a seat 10 supported at convenient height upon brackets 10$^a$.

At the rear end of seat 10 is a rumble box 11 (Figs. 1 and 14) pivoted as at 11$^a$ at its lower rear corners to a frame 10$^b$ and adapted when folded as shown in Fig. 1 to be flat on the top of the seat 10, but adapted when open, as shown in Fig. 14, to receive small articles therein, the upper end when in open position being open, and the bottom and sides being closed.

The eccentric clutch driving device as shown in Figs. 1 to 8, comprises a pair of adjacent disks 12 at the inner ends of their respective shaft sections 2 between the frames 1 and below the seat 10, each disk 12 having a relatively long hub 12$^a$ pinned to its respective axle section 2 and extending to meet the bearing 3 of its axle section 2 to prevent axial movements of the axle sections in their bearings. Preferably the ends of the sections 2 terminate within one of the hubs 12$^a$ for the purpose of properly aligning the said sections. Each disk 12 is provided with an outwardly flanged peripheral rim 12$^b$ for the purpose hereinafter set forth.

Journaled upon each hub 12$^a$ beside the rim 12$^b$ is a rocker arm 13 having its hub 13$^a$ interposed between the web of disk 12 and the bearing 3 to prevent axial movement of said lever. The outer end of each arm 13 projects beyond the rim 12$^b$ and is connected to its respective link 8 or 9 extending from the rocking beam 7, link 8 being connected to beam 7 above the pivot 7$^a$ and the other link 9 being connected thereto an equal distance below the pivot 7$^a$ so that while the upper link 8 is pulled forwardly with the forward movement of rocking beam 7 to drive its related disk 12 as hereinafter described, the other link 9 will be pulled forwardly to drive its related disk 12 on the return or rearward movement of rocking beam 7, the continuous propelling power or impulse thus alternating from one disk 12 and its related wheel 4 to the other.

Journaled in each arm 13 is a transversely disposed rock shaft 14 carrying on its inner end an eccentric cam 14$^a$ adapted when rocked to either side of shaft 14 to frictionally engage the rim 12$^b$ of its respective disk 12, but when in intermediate central position to be disengaged from said rim. On the shaft 14 at the opposite side of arm 13 is a short finger 14$^b$ having its axis parallel with that of the cam 14$^a$ and having its outer end blunted and in constant engagement with a bow spring 15 anchored in the hub 13$^a$ of arm 13 and yieldably urging the finger 14$^b$ to rotate shaft 14 so as to yieldably maintain eccentric cam 14$^a$ in frictional engagement with the rim 12$^b$.

The outer end of shaft 14 has a downwardly extending bifurcated arm 14$^c$ carrying knobs 14$^e$ and 14$^f$ respectively on the outer ends of the bifurcations for throwing the cams 14$^a$ into forward, neutral, and reverse positions, the knobs 14$^e$ and 14$^f$ as the arm 13 is rocked engaging portions of an actuating plate 16 mounted parallel with and in the path of the knobs, plate 16 being preferably secured by flanges to the frames 1, as shown in Fig. 2. The bifurcations of arm 14$^c$ are disposed at an angle of approximately 90° apart, one of the arms of the bifurcations, i. e., that carrying the knob 14$^e$ is disposed substantially parallel with the axis of the eccentric cam 14$^a$ and the short arm 14$^b$ and hence the angular relation of the arm of knob 14$^e$ will at all times give the position of its related eccentric cam.

Fig. 4 diagrammatically shows the arm 13 which is connected to the upper push rod 8; also its knobs 14$^e$ and 14$^f$ in various positions with reference to the fixed plate 16, and showing how the knobs govern the various operations of setting the cams for forward, neutral, and reverse positions. Fig. 3 shows the cam 14$^a$ in position to drive the rim 12$^b$ therewith when lever 13 is moved to the left.

In Fig. 4 when arm 13 is moving to the left and knob 14$^e$ is disposed to the left of the arm the cam 14$^a$ is likewise disposed to the left of arm 13 and is engaged with rim 12$^b$ and will drive its related rim 12$^b$ in a counter clockwise direction as shown in Fig. 3.

Within the normal working limits of the lever 13, i. e., between the positions marked "A" and "D", the position of knob 14$^e$ remains unchanged, the spring pressed lug 14$^b$ maintaining the cam 14$^a$ constantly in engagement with rim 12$^b$ so that as the arm 13 is moved to the left (Fig. 4) between the positions "A" and "D", shown in dotted lines, the movement of lever 13 will be transmitted by friction on its related disk 12 to propel the vehicle forwardly but in moving to the right between the positions "A" and "D" the cam 14$^a$ will merely slide on the face of the oppositely rotating rim 12$^b$, such opposite movement of lever 13 tending to rotate cam 14$^a$ out of engagement with the rim 12$^b$.

In the above normal position of knobs 14$^e$ and 14$^f$ for forward propulsion, (Fig. 4) said knobs are disposed on the same pitch circle with respect to axle 2, knobs 14$^e$ lying to the left of arm 13 and knob 14$^f$ lying an equal distance to the right of arm 13. Plate 16 is provided with an upstanding lug 16$^a$ which just touches the knob 14$^e$ at position "A" so that any further movement of arm 13 to the left would rotate the arms of the knobs counter clockwise and shift knob 14$^f$ to position "B". Also plate 16 is provided at its other end with a stop lug 16$^b$ having an outwardly and downwardly sloping upper edge, the upper left hand corner of said lug $16^b$ just touching the lower portion of knob $14^f$ in position "D" so that any further movement of arm 13 to the right would cause the arms of the knobs to rotate counter clockwise and shift the cam $14^a$ into neutral. In the lug $16^b$ is an arcuate slot $16^c$ of width slightly greater than the diameter of knobs $14^e$ and $14^f$, said slot $16^c$ being disposed on the pitch circle of the center of shaft 14 and the inner side of lug $16^b$ being curved on an arc $16^d$ concentric with the axis of shaft 2, so that as the arm 13 is moved to the right between the positions "D" and "E" the knob $14^f$ will slide along the upper face of lug $16^b$ into the mouth of slot $16^c$. When knob $14^f$ reaches the above position opposite slot $16^c$ (position E) the shaft 14 will have been rotated counter clockwise an amount to bring $14^e$ substantially in alignment with the axis of arm 13, and hence cam $14^a$ will be shifted into neutral position and will be disengaged from rim $12^b$. Upon still further movement of arm 13 to the right between positions "E" and "F", knob $14^f$ merely slides down in arcuate slot $16^c$ without changing the angularity of shaft 14 and during this movement cam $14^a$ is maintained in neutral position. This neutral movement of arm 13 between positions E and F actuates a braking mechanism hereinafter set forth.

Obviously, on the return or left hand movement of arm 13 from the above position between positions "F" and "E" cam $14^a$ remains neutral; and between positions "E" and "D" shaft 14 is rotated an amount in a clockwise direction sufficient to restore knobs $14^e$ and $14^f$ into normal forward driving position disposed on the same pitch circle. While returning from positions E and D knob $14^f$ is maintained in contact with the top edge of lug $16^b$ by means of a member 17 substantially rectangular in shape, pivoted as at $17^x$ at its upper right hand corner (Fig. 4) to a projection $16^c$ of plate 16 above the mouth of slot $16^c$. The lower edge $17^a$ of member 17 is substantially parallel, when in normal position, with the upper edge of lug $16^b$ but spaced therefrom a distance sufficient to permit passage of the knob $14^f$. An abutment $17^b$ on the upper left hand corner of member 17 engaging an abutment $16^f$ on lug $16^e$ prevents clockwise rotation of member 17, the abutments being normally held in contact by means of a spring $17^c$. The face $17^d$ of member 17 is slightly concave or arcuate for the purpose hereinafter described; and preferably the lower left hand corner of member 17 is disposed somewhat to the right of the upper left hand corner of lug $16^b$ thereby permitting the member 17 to be rotated counter clockwise so that its outer point will clear the mouth of slot $16^c$ for the purpose hereinafter described. The adjacent face $16^g$ of lug $16^e$ is also slightly concave or convex to conform with the edge of $17^d$ of member 17 when the outer point of member 17 clears the mouth of slot $16^c$ for the purpose hereinafter set forth.

The forward swinging movement of rocking beam 7 in the forward direction is normally controlled by a stop 18 (Figs. 1 and 8) at position "A" and mounted on one side frame 1 in front of the beam 7, and lying in the path of a normally projected slide bolt $7^c$ projecting from the side of beam 7, but which when the slide bolt $7^c$ is withdrawn permits the beam 7 to swing downwardly beyond the stop 18. Slide bolt $7^c$ is preferably formed on the end of a bell-crank lever $7^d$ pivoted on beam 7 and operated by a link $7^e$ connected to a pivoted hand lever $7^f$ under the handle bar $7^b$, whereby as lever $7^f$ is raised slide bolt $7^c$ will be retracted against the action of a coil spring $7^g$.

Means are provided for reversing the direction of drive of the coaster. In order to reverse the drive, rocking beam 7 must be thrown forward into position A (Fig. 4) to meet stop 18, then lever $7^f$ raised permitting beam 7 to swing beyond stop 18 into position B (Fig. 4) in which knob $14^e$ has, by contact with projection $16^a$ on plate 16 been thrown into position shown in full lines in Fig. 5 thereby shifting the knob so that $14^e$ assumes the normal position of knob $14^f$ in Fig. 4 which is raised above the knobs $14^e$ thereby rotating shaft 14 and lug $14^b$ counter clockwise against the action of spring 15 so the cam $14^a$ is disposed on the right hand or opposite side of shaft 14, thereby reversing the action of cam $14^a$ so that the rim $12^b$ will be gripped by cam $14^a$ to rotate same when arm 13 is moving to the right in Fig. 5, the cam $14^a$ merely sliding on the face of the rim $12^b$ when arm 13 moves to the left, and between the positions "A" and "D" the coaster will be driven backwardly. When arm 13 Fig. 5 is moved to the right the upper knob $14^f$ is moving from position D to E pushes the pivoted cam member 17 on plate 16 backwardly out of normal position, the knob $14^f$ sliding down the concave face $16^g$ towards the mouth of the slot $16^c$ of plate 16, and hence rotating cam $14^a$ clockwise into neutral position to disengage the clutch. When arm 13 passes position E the knob $14^f$ is then beyond the outer tip of cam 17 allowing spring $17^c$ to swing cam 17 back again into normal position.

In position E Fig 5 the vehicle can also be moved in either direction while arm 13 is idling in neutral position, thereby permitting coasting without moving beam 7, the eccentric clutches being disengaged. After returning from braking position knob $14^f$ is guided by the lower face $17^a$ of cam 17 into normal position as in Fig. 4 for straight ahead driving.

If the brakes are to be applied handle bars 7$^b$ may be pulled further backwards to move arm 13 from positions E to F in either Figs. 4 or 5, holding the cams in neutral position and the lever 13 after passing point E engages lug 19$^a$ on brake band 19 (Fig. 7) and thus applies the brake by contracting the band around the outer face of rim 12$^b$.

Each brake band 19 is mounted above its respective rim 12$^b$ and has one end 19$^b$ fixed to a support 19$^c$ extending between the side frames 1, the fixed end being that adjacent the end of plate 16 having the lug 16$^a$. Band 19 curves over the rim 12$^b$ beside its related arm 13, and its projection 19$^a$ lies in the path of and contracts with arm 13 at the position "E", whereby further movement of the arm 13 from position "E" to "F" will tension the band 19 and draw same down upon its related rim 12$^b$ to brake the same by friction. Suitable guides (not shown) for maintaining the bands 19 in operative position may be provided.

Thus it will be seen that the rocking beam 7 will rock the two arms 13 from points A to D alternately driving disks 12 in either direction to propel the vehicle in whichever direction the eccentric clutches 14$^a$ are thrown. If the car is running forwardly and the operator wishes to reverse or drive the car backwards, it will be necessary for him to throw the beam 7 forwardly raising lever 7$^f$ to permit the beam 7 to pass stop 18 and into position "B" (Fig. 4). The clutch cam 14$^a$ will then be shifted from forward (Fig. 4) to the reverse (Fig. 5) driving positions by means of engagement of knob 14$^e$ with stop lug 16$^a$. To continue operating backwards the beam 7 is rocked between positions A and D. To reset the cams for forward driving the handle bars 7$^b$ are pulled backwards to throw arm 13 into neutral position "E" and the knob 14$^f$ will be forced down incline 16$^g$ into position "E" and the car is placed in forward motion again after the knob 14$^f$ passes to the left out from under cam 17 and when the handle bars are shoved forwards the knob 14$^f$ is in normal position for straight-ahead driving.

The position of plate 16 for the arm operated by link 9 at the other side of the vehicle is just reversed from that of the one above described; but the plates and the operations are the same for both clutches.

A modification of the vehicle is shown in Figs. 9 to 14 inclusive. In this modification the same propelling means as above described is used, but steering of the vehicle is effected by means of rocking the operator's seat 20 which is mounted on V-shaped brackets 20$^a$ having bearings 20$^b$ in their apexes disposed on the longitudinal axis of the frame and keyed or pinned on a longitudinally disposed rod 21 journaled in bearings 21$^a$ extending between the frames 1 at their upper ends whereby rocking of seat 20 will also rock the rod 21. This rod extends forwardly to a point adjacent the front axle 5, and its frnot end is provided with a depending arm 21$^b$ which has a universal connection with a link 22 the opposite end of which link has a universal connection with a rearwardly extending arm 5$^x$ at one side of the front axle 5 whereby rocking rod 21 will correspondingly swivel the front axle, thus the hands and feet of the operator may be utilized for propelling purposes, a foot rest 7$^x$ being provided at the lower end of rocking beam 7 in order that the foot power may augment the hand power.

Means are provided for normally maintaining or locking the front axle 5 in straight-ahead position. As shown the rear bearing 21$^a$ for rod 21 has its bore slightly elongated vertically to permit the rear end of rod 21 to be raised slightly in its bearing. A bowed spring 21$^g$ fits under the rod 21 and has its end resting upon the side frames 1 for normally maintaining the rod 21 raised in the bearing. On the end of rod 21 adjacent the bearing is an enlarged head 21$^x$ having two parallel sides spaced apart a distance equal to the diameter of rod 21, its opposite sides being cut on the arc of a circle somewhat larger in diameter than that of rod 21. Coaxial with bearing 21$^a$ is an annular flange 21$^y$ within which the head 21$^x$ of rod 21 makes a rotating fit as in Fig. 12 when the rear end of rod 21 is depressed. The upper portion of flange 21$^y$ is cut away a distance equal to the diameter of rod 21 to receive the parallel sides of the head when the load on seat 20 is removed and rod 21 rotated to bring the parallel sides of the head in alignment with the cut-away portion of the flange, as in Fig. 13, whereupon the spring 21$^g$ will raise the end of rod 21, and the rod will be locked from rotation until seat 20 is again depressed.

I do not limit my invention to the exact forms shown in the drawings for obviously changes may be made therein within the scope of the claims.

I claim:

1. In a vehicle, an axle, a driving ring on said axle; a lever journaled on said axle beside the ring; clutch means for rotating the ring with the lever when same is rocked within its normal working limits; means for automatically disengaging the clutch after the lever has been rocked outside of the limits of its normal working stroke; and means for automatically reengaging the clutch when the lever again returns within the limits of its normal working stroke.

2. In combination with a vehicle as set forth in claim 1, a brake for said ring; and means whereby the lever will automatically apply the brake after the clutch has been disengaged.

3. In a vehicle, an axle, a driving ring on said axle; a lever journaled on said axle beside the ring; clutch means for rotating the ring with the lever when same is rocked within its normal working limits; means for automatically disengaging the clutch after the lever has been rocked beyond the one end of its normal working stroke; means for automatically reengaging the clutch when the lever returns within the limits of its normal working stroke; and means at the other end of the normal working stroke for automatically reversing the clutch whereby the lever will drive the ring in the opposite direction during its normal working stroke.

4. In combination with a vehicle as set forth in claim 3, a brake for said ring; and means whereby the lever will automatically apply the brake after the clutch has been disengaged and upon further rotation of the lever away from its normal driving limits.

5. In a vehicle, an axle, a driving ring on said axle; a lever journaled on said axle beside the ring; clutch means for rotating the ring with the lever when same is rocked within its normal working limits; means for automatically disengaging the clutch after the lever has been rocked beyond one end of its normal working stroke; means at the other end of the normal working stroke for automatically reversing the clutch to cause the lever to drive the ring in the opposite direction during its normal working limits; means at the first mentioned end of the stroke for automatically disengaging the clutch; and means for automatically reengaging the clutch for normal straight-ahead driving when the lever again returns within the limits of its normal working stroke.

6. In combination with a vehicle as set forth in claim 5, a brake band around said ring; and means whereby the lever will automatically contract the band after the clutch has been disengaged and upon further rotation of the lever away from its normal driving limits.

7. In a vehihcle, an axle, a driving ring on said axle; a lever journaled on said axle beside said ring; a cam shaft journaled in said lever; an eccentric cam on said shaft within the ring; means for yieldably rotating the cam into driving contact with the ring; and means for automatically shifting and maintaining the cam in neutral position when the lever is rocked beyond one end of its normal working limits, and means restoring the cam to driving position when the lever returns within the limits of its working stroke.

8. In combination with a vehicle as set forth in claim 7, a brake band around the ring having one end fixed; and a projection on the other end of the band extending into the path of the lever and adapted to contact therewith as the cam is shifted into neutral position, whereby further rotation of the lever away from the normal limits of its working stroke will contract the band against the ring.

9. In a vehicle as set forth in claim 7, said yieldable means for rotating the cam comprising a finger on the cam shaft having its outer end blunted; and a bow spring anchored on the lever and having its free end engaging the outer end of the finger, said spring being substantially normal to the finger when the cam is in neutral position.

10. In combination with a vehicle as set forth in claim 7, a rocking beam pivoted on the vehicle for actuating the lever; a link connecting the lever and beam; a stop adjacent the beam; a bolt on the side of the beam normally engaging the stop for maintaining the lever within its normal working limits; and means on the beam for retracting the bolt.

11. In combination with a vehicle as set forth in claim 7, said axle being broken and each axle section having its driving ring and actuating lever; a rocking beam pivoted on the vehicle for actuating said levers; a link connecting the lever of one axle section to the beams above its pivot; and a link connecting the other lever to the beam an equal distance below its pivot, whereby the driving impulse will be imparted to one axle section when the beam is moved in one direction, the driving impulse being in the same direction but imparted to the other axle section upon the return stroke of the beam.

12. In a vehicle as set forth in claim 7, said means for automatically shifting the cam comprising an arm on the cam shaft having a knob; a fixed plate disposed in the path of swing of said knob and having a cut-away portion in which the knob may swing unobstructed between the normal working limits of the lever; said plate having a slot adapted to be engaged by the knob to rotate the cam into neutral position as the lever is swung beyond its normal working limit.

13. In a vehicle, an axle, a driving ring on said axle; a lever journaled on said axle beside the ring; a cam shaft journaled in said lever; an eccentric cam on said shaft within the ring; means for yieldably rotating the cam into driving contact with the ring; means for automatically shifting and maintaining the cam in neutral position when the lever is rocked beyond one end of its normal working limits, said means restoring the cam to driving position when the lever returns within the limits of its working stroke; and means when the lever is rocked beyond the other end of its normal working limit for automatically reversing the position of the cam for driving the vehicle in the opposite direction.

14. In a vehicle as set forth in calim 1, said means for automatically shifting the position of the cam comprising a bifurcated arm on the cam shaft having a knob on each branch thereof; a fixed plate disposed in the path of swing of said knobs and having a cut away portion in which the knobs may swing unobstructed in either position of the cam within the normal working limits of the lever; a projection at one end of the plate contacting with the adjacent knob when the lever passes beyond its normal working limits to shift the cam into reverse position; converging portions at the opposite end of the plate adapted to engage the adjacent knob when the cam is in either normal or reverse position and to shift the cam into neutral position as the lever passes beyond its normal working limits; and an arcuate slot at the apex of said converging portions coaxial with said lever for maintaining the cam in neutral position as the lever continues to move away from its working limits.

15. In a vehicle, an axle, a driving ring on said axle; a lever journaled on said axle beside the ring; a cam shaft journaled in said lever; an eccentric cam on said shaft within the ring; means for yieldably maintaining the cam in contact with the ring; means for automatically shifting and maintaining the cam in neutral position when the lever is rocked beyond one end of its normal working stroke; means when the lever is rocked beyond the other end of its normal working stroke for automatically reversing the position of the cam for driving the vehicle in the opposite direction; means at the first end of the stroke for returning the cam from reverse position to neutral position; and means for automatically restoring the cam to normal straight-ahead driving position when the lever returns again within the limits of its working stroke.

16. In a vehicle as set forth in claim 15, said means for automatically shifting the position of the cam comprising a bifurcated arm on the cam shaft having a knob on each branch thereof; a fixed plate disposed in the path of swing of said knobs and having a cut away portion in which the knobs may swing unobstructed in either position of the cam within the normal working limits of the lever; a projection at one end of the plate contacting with the adjacent knob when the lever passes beyond its normal working limits to shift the cam into reverse position; converging portions at the opposite end of the plate adapted to engage the adjacent knob when the cam is in either normal or reverse position and to shift the cam into neutral position as the lever passes out of its normal working limits; an arcuate slot at the apex of said converging portions coaxial with said lever for maintaining the cam in neutral position while the lever moves therepast; and a yieldable guide between said converging portions adapted to permit passage therepast of the knob to the apex of said portion and to restore the knob to normal forward driving position when the knob returns from said converging portions into the normal working limits of the lever.

17. In a vehicle, an axle; a driving ring thereon, a lever journaled beside the ring; clutch means for rotating the ring with the lever when the same is rocked within its normal working limits; means for maintaining the clutch disengaged after the lever has passed beyond one end of its normal working stroke; a brake band around said ring having one end fixed; and a projection on the other end of the band extending into the path of the lever and adapted to contact therewith as the clutch is disengaged; whereby further movement of the lever away from its normal working limits will contract the band against the ring.

In testimony that I claim the foregoing as my own I affix my signature.

WILLIAM J. PUGH.